March 18, 1958 S. B. FREIBERG 2,826,977
DEVICE FOR MAKING LISTS
Filed Oct. 25, 1954 2 Sheets-Sheet 1
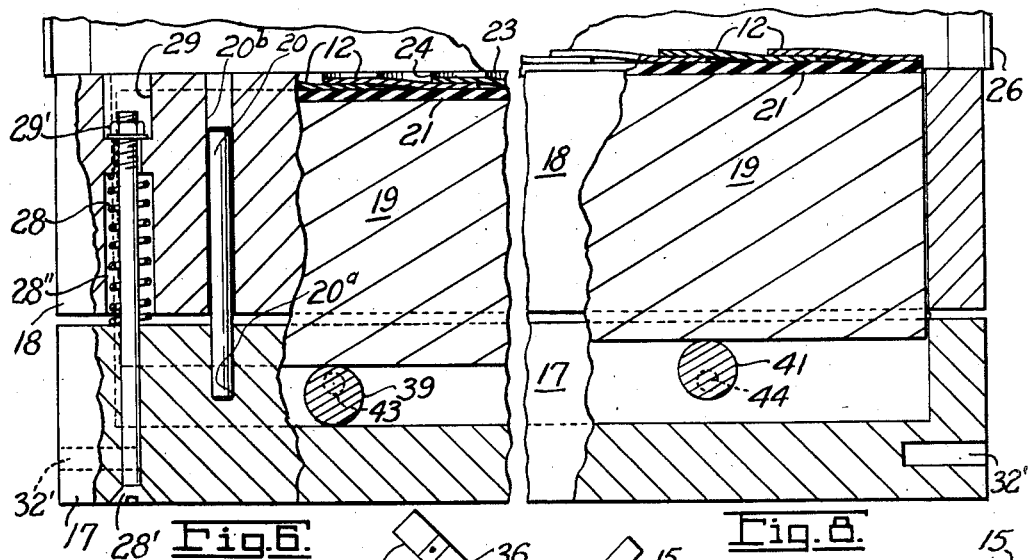
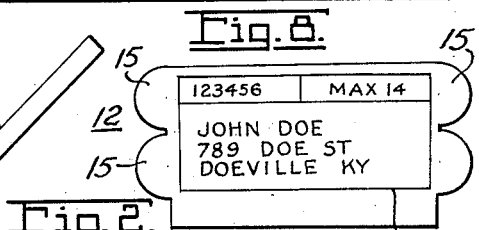
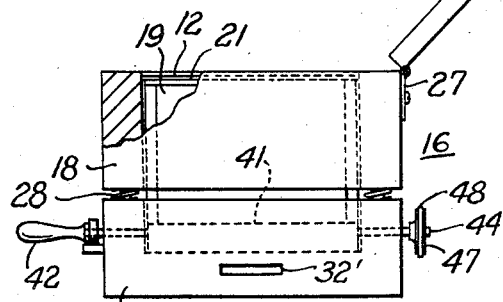
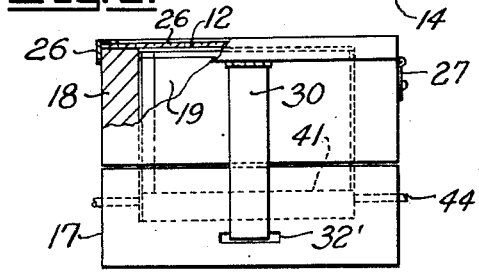
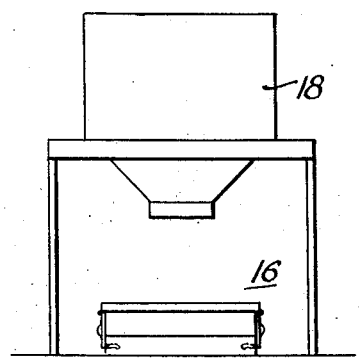
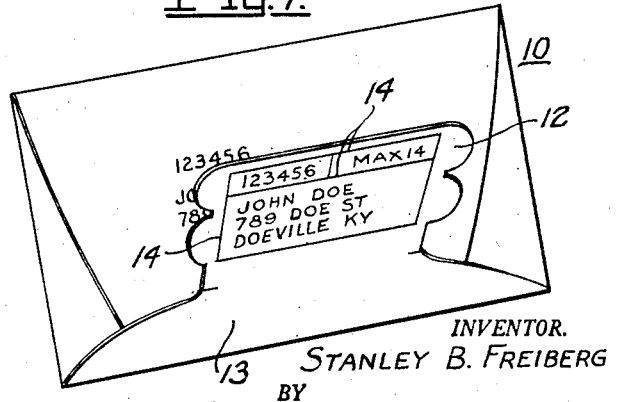
INVENTOR.
STANLEY B. FREIBERG
BY
Zugelter & Zugelter
Attys.

March 18, 1958 — S. B. FREIBERG — 2,826,977
DEVICE FOR MAKING LISTS
Filed Oct. 25, 1954 — 2 Sheets-Sheet 2

INVENTOR.
STANLEY B. FREIBERG
BY Zugelter & Zugelter
Attys.

United States Patent Office 2,826,977
Patented Mar. 18, 1958

2,826,977

DEVICE FOR MAKING LISTS

Stanley B. Freiberg, Cincinnati, Ohio; Rosalie B. Freiberg, executrix of said Stanley B. Freiberg, deceased, assignor to Rosalie B. Freiberg Application October 25, 1954, Serial No. 464,562

5 Claims. (Cl. 95—85)

This invention relates to a device for holding a plurality of indicia-bearing tabs while the indicia on the tabs is copied photographically and to a method of photographically copying data on such tabs.

In photographically copying the data on cards or tabs, or the like, it is necessary that the tabs or cards be properly aligned and firmly held in place at a fixed distance from a camera so that a proper photograph may be made thereof.

An object of this invention is to provide a device which holds a plurality of tabs in alignment so that a photograph can quickly and easily be taken to make a list of the data on the tabs.

A further object of this invention is to provide a device into which such tabs may quickly and readily be loaded and from which the tabs may quickly and easily be stripped when a photograph has been taken thereof.

A further object of this invention is to provide a device in which a plunger having a substantially flat upper face holds indicia-bearing tabs firmly against a transparent plate, such as a glass plate, while a photograph is being taken thereof, and in which, when the glass plate is removed, the plunger is arranged to raise the tabs above the level of tab-holding devices so that the tabs can quickly be stripped therefrom.

A further object of this invention is to provide a machine of this type in which the plunger can be readily positioned below the upper face of a guide frame so that tabs or cards may be guided into proper position on the upper face of the plunger with the aid of guide indentations in the frame and registering projections on the tabs.

A further object of this invention is to provide a device of this type having means for blanking out selected portions of the data on the tabs so that only the desired portions are photographed.

A further object of this invention is to provide a method of making a list of data on a plurality of tabs or cards by aligning the tabs or cards in a frame, holding the aligned tabs against a transparent plate and photographing the aligned tabs.

The above and other objects and features of the invention will be apparent to those skilled in the art to which this invention pertains from the following detailed description, and the drawings, in which:

Figure 1 is a perspective view showing an envelope provided with a tab of the type used in forming a list according to the method of this invention;

Fig. 2 is a plan view of a tab cut from the envelope shown in Fig. 1;

Fig. 3 is a view in side elevation showing a tab-holding device constructed in accordance with an embodiment of this invention, the device being shown in conjunction with a camera;

Fig. 5 is a view in side elevation, partly broken away and in section, of the device with the tabs loaded therein prior to photographing thereof;

Fig. 6 is a fragmentary enlarged view partly in front elevation and partly in section showing one end of the device with tabs loaded therein prior to photographing thereof;

Fig. 7 is a view in end elevation, partly broken away and in section showing the device with the cover in closed position ready for photographing; and Fig. 8 is a fragmentary enlarged view partly in front elevation and partly in section showing one end of the device with the cover open and the plunger in raised or stripping position ready for removal of a set of tabs which have been photographed.

In the following detailed description, and the drawings, like reference characters indicate like parts.

Figure 4:
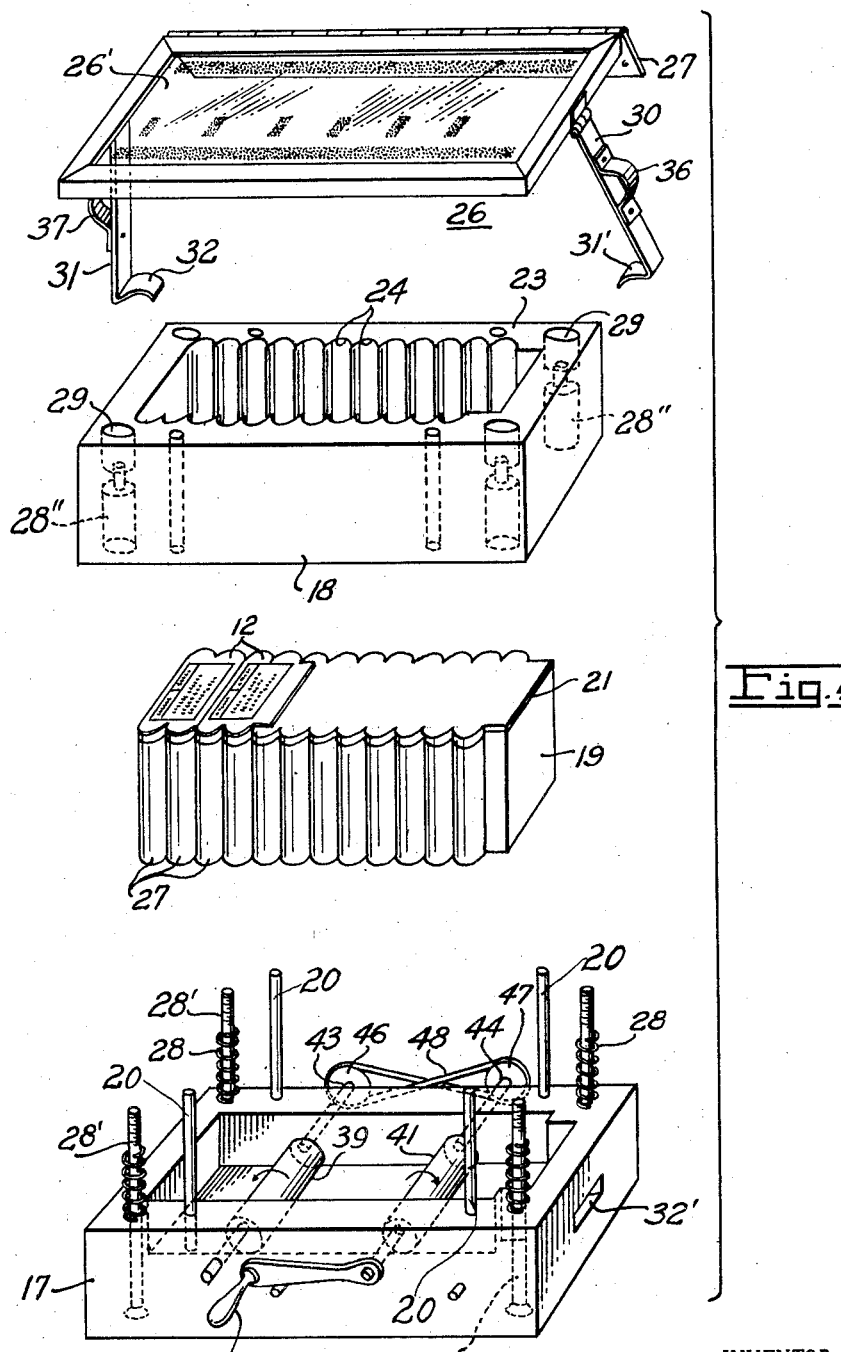
Fig. 4 is an exploded perspective view showing details of construction of the component parts of the device illustrated in Fig. 3.

In Fig. 1 is shown an envelope 10 provided with a tab 12 which is integral with the flap 13 thereof. This type of envelope is commonly used in connection with various campaigns and solicitations. The tab is provided with guide lines 14 which define spaces for various indicia such as an address, a license tag number, and an indication of the type of automobile owned by the person whose address is typed thereon. The tab is provided with a carbon backing so arranged that, as the indicia is typed thereon, selected portions of the indicia are reproduced on the back of the envelope 10. Then the tab is cut off to form a cut-off tab, as shown in Fig. 2. The cut-off tab is preserved as a record of the indicia on the envelope.

As shown, each tab is provided with outwardly directed projections or scallops 15 on the sides thereof for use in aligning the tab with other tabs and with the tab holders.

The tabs are used as the source for information from which lists of names and addresses are prepared for various uses and for sale. The copying of such indicia into lists is a lengthy and laborious chore. By the method of this invention, the data on a plurality of tabs is copied into a list by photographing the tabs on appropriate photographic material. In order that the tabs may be photographed, the tabs are mounted in a holder 16 which is arranged to hold the tabs in proper alignment as the tabs are photographed by means of a camera 18.

Details of construction of the tab-holding device 16 are illustrated in Figs. 4–8 inclusive.

The tab-holding device 16 includes a base 17, a hollow frame 18, which is mounted on the base, and a plunger 19. The frame 18 and base 17 are kept in alignment by a plurality of upright alignment pins 20 which are received in sockets 20a in the base 17 and sockets 20b in the frame 18 (see Fig. 6). The plunger 19 is mounted for vertical reciprocation inside the frame 18. The upper end of the plunger carries a rubber layer 21 which forms a flat surface on which tabs may be arranged as illustrated in Figs. 6 and 7. In addition, the sides of the plunger are provided with outwardly directed projections or scallops 27 which are of the same size and shape as the scallops 15 of the tabs, so that, as indicated in Fig. 4, a plurality of tabs may be loaded on the plunger 19 with the scallops of the tabs registering with scallops of the plunger. During loading, the plunger 19 is disposed inside the frame as shown in Fig. 6, with the upper face thereof below the upper face 23 of the frame. As shown in Fig. 8, the frame is provided with a plurality of scallop-shaped indentations 24 which are the same shape and size as and receive the scalloped edges of the plunger. The scalloped indentations on the frame register with the projections on the tabs to properly align the tabs and so that the tabs can quickly and easily be mounted on top of the plunger with the desired portions of the indicia on the tabs presented to view. Thus, the tabs are aligned by means of the registering of the outside shape or contour of the tabs with the frame.

When the tabs have been mounted on the plunger in proper position for photographing, a cover member 26 is closed. The cover member 26 includes a central plate portion 26' of glass or other transparent material which is held against the tabs when the cover is closed. The cover member 26 is hinged to the rear of the frame by means of hinges 27. As shown most clearly in Figs. 4 and 6 the frame is mounted on compression springs. The springs are mounted on the shanks of bolts 28'. The bolts 28' extend vertically through the base and into wells 28" in the frame. There is a spring 28 in each of the wells. The upper end of each bolt extends through the upper wall of the well associated therewith into a socket 29. Nuts 29' on the upper ends of the bolts limit upward movement of the frame under the urging of the springs 28. When the cover is closed and latched to the base the transparent plate portion 26' is pressed firmly against the tabs. The cover includes cover-locking or latching arms 30 and 31 disposed at opposite ends of the frame. Locking flanges 31' and 32 at the lower ends of the arms 30 and 31, respectively, when received in slots 32' in the base 17, draw the frame downwardly until the tabs are flush and flatwise against the under side of the plate portion 26' of the cover. The tabs are photographed through the plate portion 26'.

As shown in Fig. 4, portions of the plate 26' may be etched or otherwise made opaque to obscure selected portions of indicia on the tabs, as, for example, the license numbers on the tabs. When a set of tabs on the plunger 19 have been photographed, the arms 30 and 31 are pulled downwardly by means of handles 36 and 37 whereby the cover may be released and placed in open position. The plunger is then raised to a position shown in Fig. 8, in which position the upper face of the plunger is above the upper face of the frame, so that the tabs may readily be removed or stripped from the upper face of the plunger.

The plunger may be raised by means of cam rollers 39 and 41, as illustrated in Fig. 4. The cam rollers are operated by means of a crank 42. The cam rollers 39 and 41 are mounted on shafts 43 and 44, respectively. Shafts 43 and 44 carry pulleys 46 and 47, respectively, on which a belt 48 runs to cause the cam rollers to turn in unison, but in opposite directions for raising the plunger to the position of Fig. 8.

The color of the guide lines on the tabs may be of a type known as a "fugitive color," so that a photographic film may be used which is insensitive to the color used in the guide lines. However, the color employed in the indicia is of a type to which the film is sensitive. Thus, in the photographically prepared list, the guide lines will not register, while the indicia on the tabs will clearly appear.

The device for holding tabs during photographing, and the method of photographically preparing lists described above and illustrated in the drawings, are subject to modification without departing from the spirit and scope of the appended claims.

Having described my invention, what I claim as new and desire to secure by Letters Patent is:

1. A device for holding a plurality of indicia bearing tabs having data-aligning projections on the sides thereof in position to be photographed, which comprises a base, a hollow guide frame, said guide frame being provided with means for yieldingly supporting the same on said base, a plunger reciprocatingly mounted in said frame, said plunger having an elongated substantially flat upper face for supporting the tabs, means for actuating said plunger between a loading position in which the upper face of the plunger is below the upper face of the frame and a stripping position in which the upper face of the plunger is at least as high as the upper face of the frame, the frame having a plurality of indentations therein for registering with the projections of a plurality of tabs to align the tabs in echelon arrangement on top of the plunger, there being a plurality of projections on said plunger registering with the indentations of the frame and aligned with the upper face of the plunger, the projections of the plunger being adapted to underlie the projections of the tabs to support the projections of the tabs, a closure member, said closure member having a transparent plate portion for overlying the upper face of the plunger, and a portion for overlying the upper face of the frame, and means for drawing the closure member downwardly to depress the frame and hold the transparent plate portion against the tabs, the tabs being freed from the indentations of the frame when the cover is opened and the plunger is raised to stripping position.

2. A device for holding a plurality of indicia bearing tabs having data-aligning projections on the sides thereof in position to be photographed which comprises a hollow guide frame, a plunger reciprocatingly mounted in said frame, said plunger having an elongated substantially flat upper face for supporting the tabs, means for actuating said plunger between a loading position in which the upper face of the plunger is below the upper face of the frame and a stripping position in which the upper face of the plunger is at least as high as the upper face of the frame, the frame having a plurality of indentations therein for registering with the projections of a plurality of tabs to align the tabs in echelon arrangement on top of the plunger, there being a plurality of projections on said plunger registering with the indentations of the frame and aligned with the upper face of the plunger, the projections of the plunger being adapted to underlie the projections of the tabs to support the projections of the tabs, a closure member, said closure member having a transparent plate portion for overlying the upper face of the plunger, and means for drawing the closure member against the tabs on said indicia supporting face, the tabs being freed from the indentations of the frame when the cover is opened and the plunger is raised to stripping position.

3. A device for holding a plurality of indicia-bearing tabs having data aligning projections on the sides thereof in position to be photographed, which comprises a base, a hollow guide frame mounted on said base, means for yieldably urging the guide frame upwardly from the base to a raised position, a plunger reciprocably mounted in said frame for up and down movement therein, said plunger having an elongated substantially flat upper face for supporting the tabs, means for actuating the plunger between a loading position in which the upper face of the plunger is below the upper face of the frame when the frame is in raised position and a stripping position in which the upper face of the plunger is at least as high as the upper face of the frame in raised position, the frame having a plurality of indentations in the sides of the opening thereof for registering with the projections of a plurality of the tabs to align the tabs in echelon arrangement on top of the plunger, there being a plurality of projections on said plunger registering with the indentations of the frame and aligned with the upper face of the plunger, the projections of the plunger being adapted to underlie the projections of the tabs to support the projections of the tabs, a closure member, said closure member having a transparent plate portion for overlying the tab-supporting face of the plunger and a portion for overlying the upper face of the frame, means for drawing the closure member downwardly to depress the frame and hold the transparent plate portion against the tabs, the tabs being freed from the indentations of the frame when the cover is opened and the plunger is raised to stripping position.

4. A device for holding a plurality of indicia bearing tabs having data aligning projections on the sides thereof in position to be photographed which comprises a hollow guide frame, a plunger reciprocably mounted in said frame for up and down movement therein, said plunger having an elongated substantially flat upper face for supporting the tabs, means for actuating the plunger between a loading position in which the upper face of the plunger is below the upper face of the frame and a stripping position in which the upper face of the plunger is at least as high as the upper face of the frame, the frame having a plurality of indentations in the sides of the opening thereof for registering with the projections of a plurality of the tabs to align the tabs in echelon arrangement on top of the plunger, there being a plurality of projections on said plunger registering with the indentations of the frame and aligned with the upper face of the plunger, the projections of the plunger being adapted to underlie the projections of the tabs to support the projections of the tabs, and a closure member, said closure member having a transparent plate portion for overlying the upper face of the plunger and releasably engageable by the tabs, the tabs being freed from the indentations of the frame when the cover is released and the plunger is in stripping position.

5. A device for holding a plurality of indicia bearing tabs having data aligning projections on the sides thereof in position to be photographed which comprises a hollow guide frame, a plunger reciprocably mounted in said frame for up and down movement therein, said plunger having an elongated substantially flat upper face for supporting the tabs, and, means for actuating the plunger between a loading position in which the upper face of the plunger is below the upper face of the frame and a stripping position in which the upper face of the plunger is at least as high as the upper face of the frame, the frame having a plurality of indentations in the sides of the opening thereof for registering with the projections of a plurality of the tabs to align the tabs in echelon arrangement on top of the plunger, there being a plurality of projections on said plunger registering with the indentations of the frame and aligned with the upper face of the plunger, the projections of the plunger being adapted to underlie the projections of the tabs to support the projections of the tabs, the tabs being freed from the indentations of the frame when the plunger is in stripping position.

References Cited in the file of this patent

UNITED STATES PATENTS

| | | |
|---|---|---|
| 1,916,282 | Peacock | July 4, 1933 |
| 1,933,953 | Ames | Nov. 7, 1933 |
| 1,999,616 | Peterson | Apr. 30, 1935 |
| 2,609,613 | Capers | Sept. 9, 1952 |
| 2,627,794 | Murphy | Feb. 10, 1953 |